Figure 1:
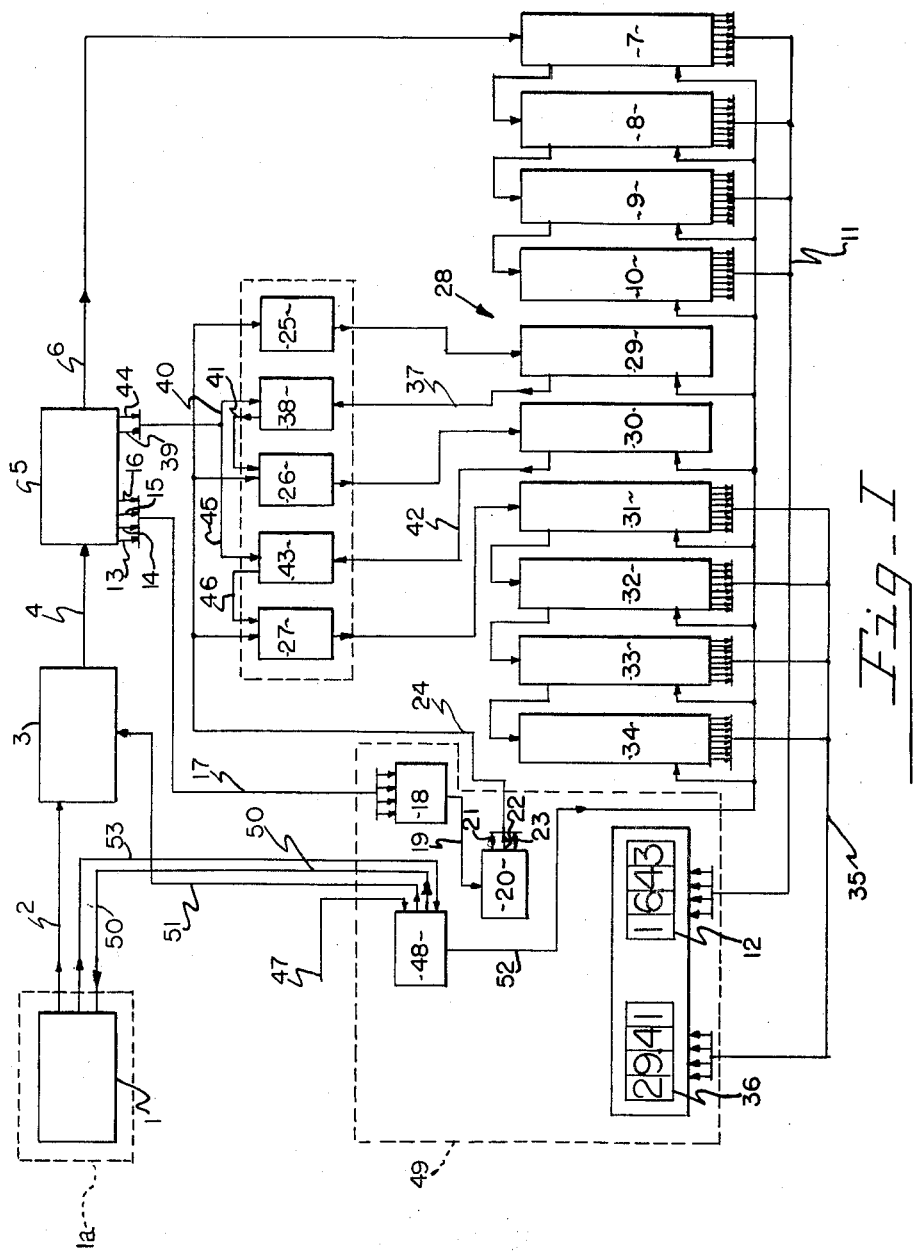

Aug. 25, 1964   R. E. BELL   3,145,792
COMPUTING WEIGHING SCALE
Filed March 21, 1961   5 Sheets-Sheet 1

INVENTOR.
ROBERT E. BELL
BY
Marshall & Wilson
ATTORNEYS

Aug. 25, 1964     R. E. BELL     3,145,792
COMPUTING WEIGHING SCALE
Filed March 21, 1961     5 Sheets-Sheet 2
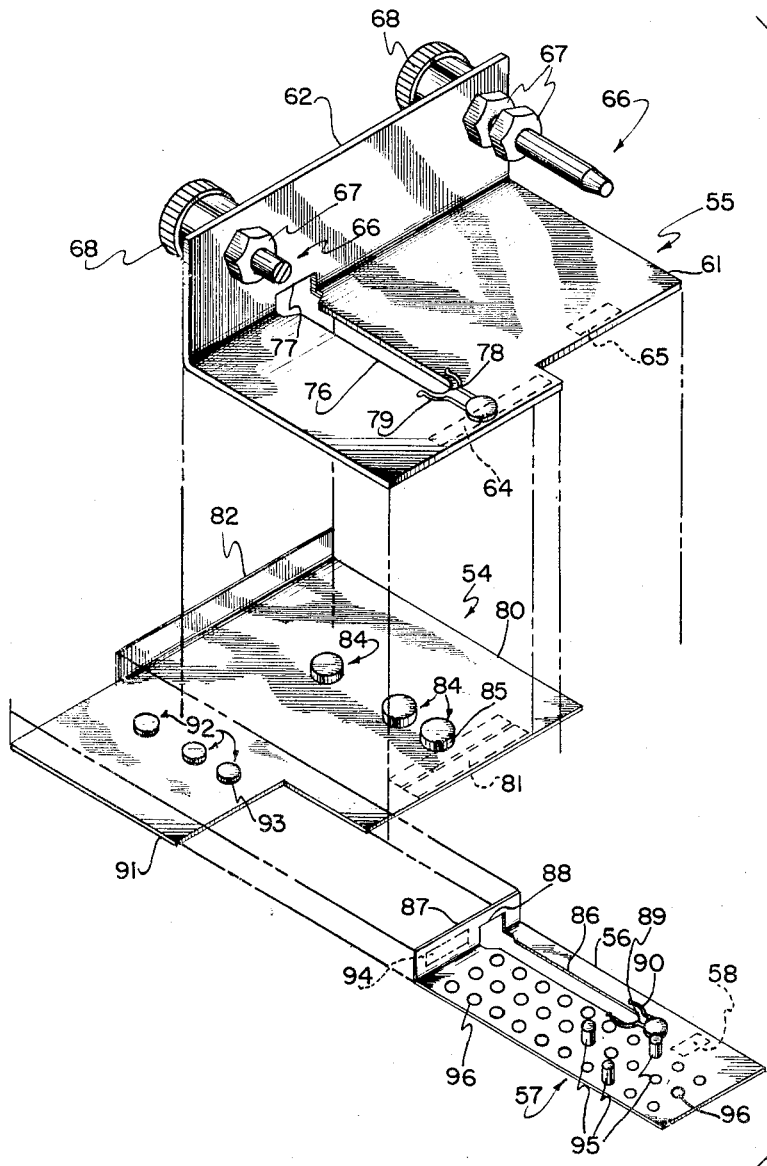
Fig. II
INVENTOR.
ROBERT E. BELL
BY
Marshall & Wilson
ATTORNEYS Aug. 25, 1964     R. E. BELL     3,145,792
COMPUTING WEIGHING SCALE
Filed March 21, 1961     5 Sheets-Sheet 3
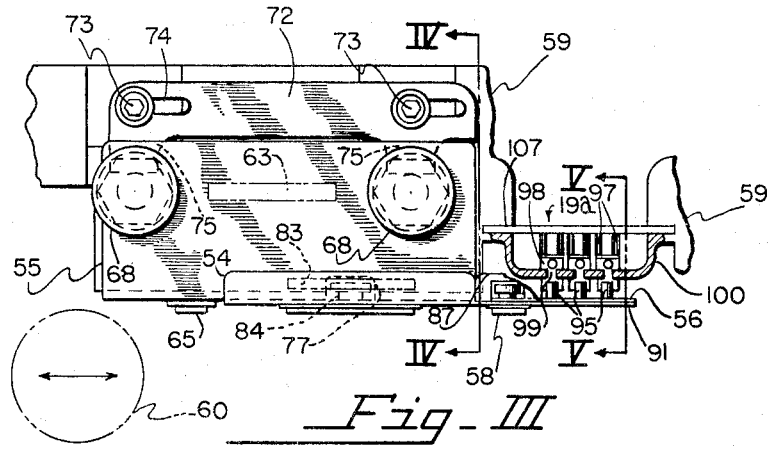
Fig. III
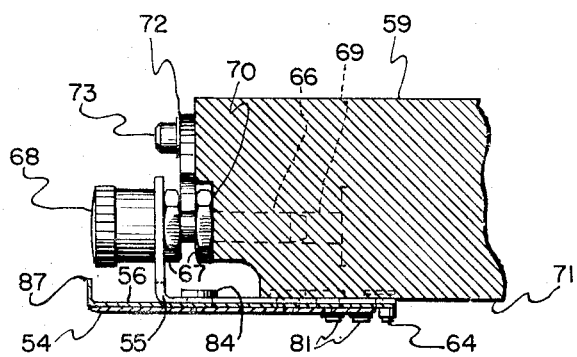
Fig. IV
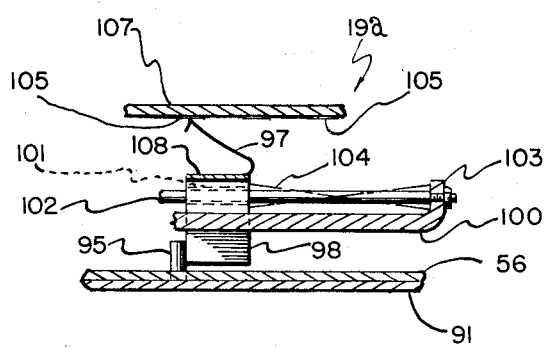
Fig. V
*INVENTOR.*
ROBERT E. BELL
BY
Marshall & Wilson
ATTORNEYS Aug. 25, 1964 R. E. BELL 3,145,792
COMPUTING WEIGHING SCALE
Filed March 21, 1961 5 Sheets-Sheet 4
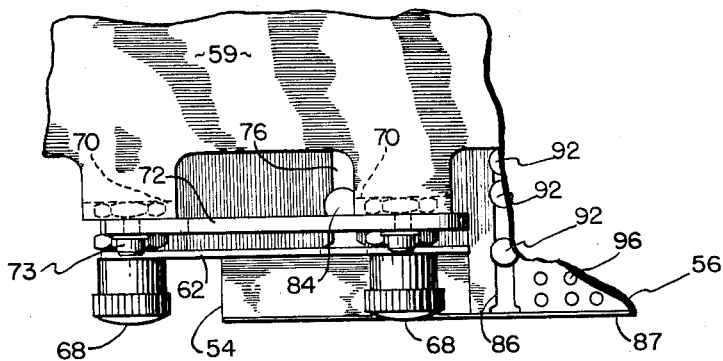
_Fig_VI
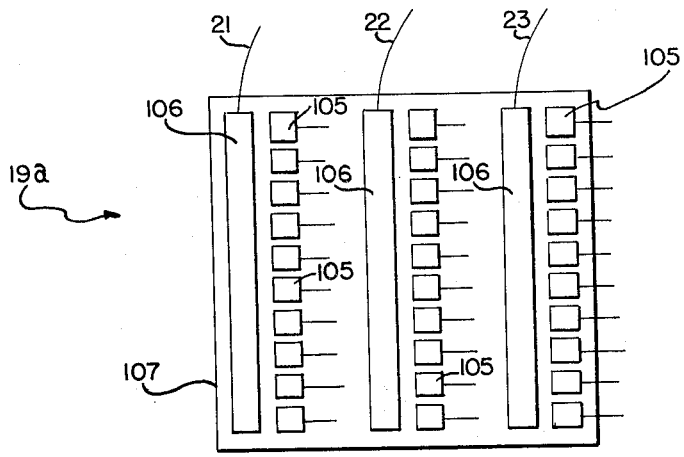
_Fig_VII
INVENTOR.
ROBERT E. BELL
BY
Marshall & Wilson
ATTORNEYS

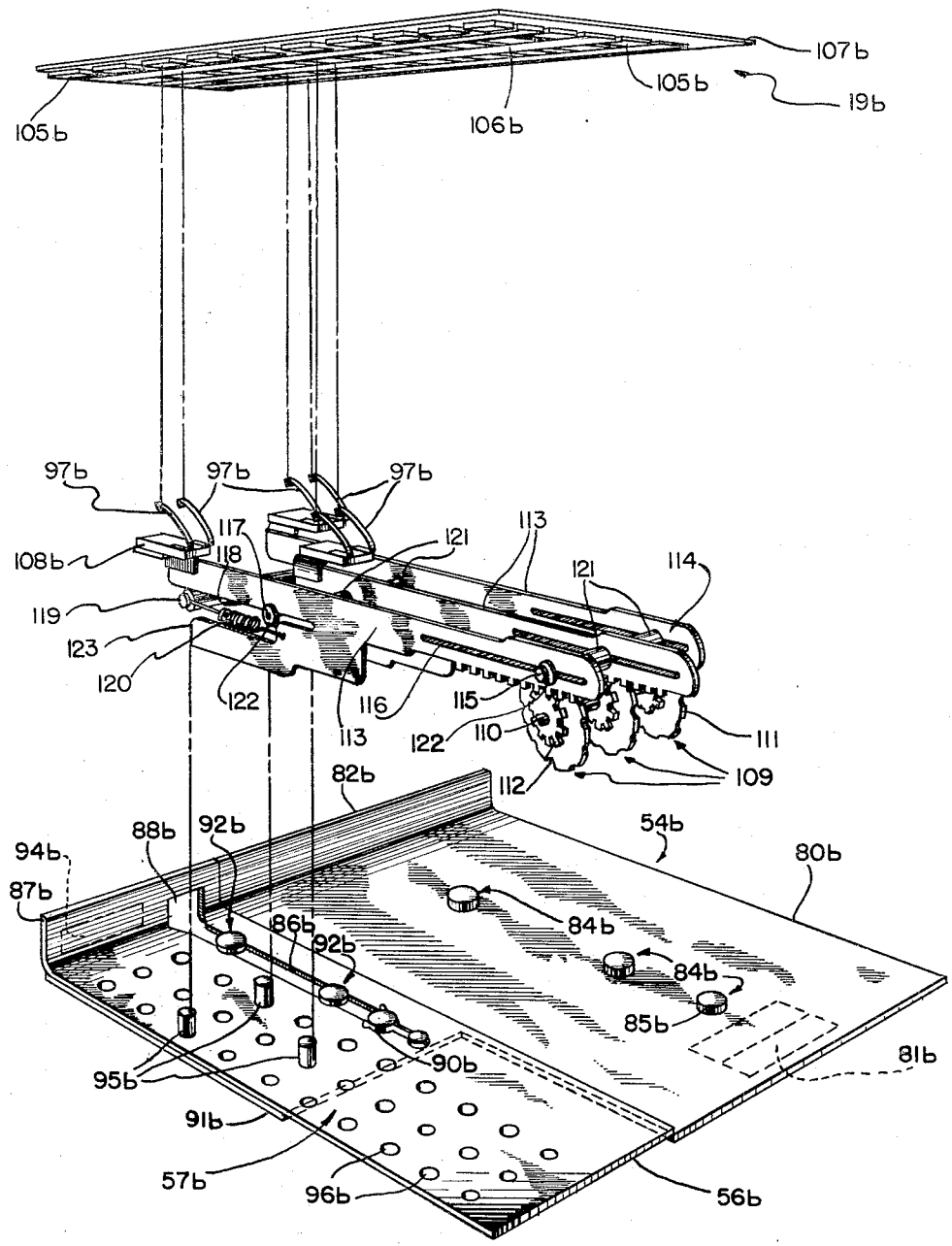
Fig. VIII

United States Patent Office 3,145,792
Patented Aug. 25, 1964

3,145,792
COMPUTING WEIGHING SCALE
Robert E. Bell, Toledo, Ohio, assignor to Toledo Scale Corporation, Toledo, Ohio, a corporation of Ohio
Filed Mar. 21, 1961, Ser. No. 97,362
20 Claims. (Cl. 177—4)

This invention relates to electrical and electronic computing weighing scales and more particularly to improved techniques in setting up means for printing the prices per units of weight and setting up the price factors in the computers of such weighing scales.

Heretofore, printing of the price per unit of weight in electrical and electronic computing weighing scales has been accomplished by means of printing wheels or sectors, one for each digit or place in the price, which are set up by manually operated knobs. These knobs also set up the price factor in the computer of the weighing scale by operating selector switches operatively connected to the computer. The computer computes the money value of a package of goods according to the weight of that particular package and the arbitrarily selected price factor, i.e., the price per unit of weight of the material, and the scale prints a ticket, label or the like bearing thereon such money value and such selected price together with the net weight, date, store code, commodity name, and commodity grade.

The foregoing manually operated knob technique for setting up the means for printing the price and setting up the price factor in the computer is unsatisfactory in several ways. For one thing, the time required to look up the correct price of a commodity when changing from the packaging of one commodity to another in food store pre-packaging operations and the setting up of the price by means of the manually operated knobs together with the time required to change-over the printer for printing the name of the new commodity may be equal to as much time as the actual weighing operation. That is, the down time in an average electrical or electronic pre-packaging weighing operation may be equal to the actual operating time.

Second, in the prior electrical and electronic weighing scales, interlock systems are necessary to require the price per pound knobs to be reset after every change-over of the printers for printing the names of different commodities. This is designed, for example, to prevent one from leaving the computers set up with price factors corresponding to low cost items after changing from packaging low cost items to high cost items. However, such interlock system is of high cost and is not fool-proof because it requires only that the price per pound knobs be reset and not reset to the correct prices.

Third, the foregoing manually operated knob technique for setting up the means for printing the price and setting up the price factor in the computer is generally unsatisfactory because operators are apt to make mistakes in looking up the commodity prices and in setting the price knobs.

Accordingly, the objects of this invention are to improve computing weighing scales, to simplify the construction of such scales, to simplify the operation of such scales, and to improve the techniques of setting up means for printing the prices per units of weight and setting up the price factors in the computers of such scales.

One embodiment of this invention enabling the realization of these objects is a combination of means for weighing a commodity, computing the value of the commodity according to its weight and a selected price and recording the value with mechanism, such as commutator means or selector switch means, operatively connected to the computing means for conditioning the computing means according to the selected price, and printing type, borne by printing wheels or sectors or a plate, for printing the selected price, together with such plate which is detachably mounted and which cooperates with the mechanism and with the printing type for operating the mechanism according to the selected price and for moving the printing type into printing position.

In accordance with the above, a feature of this invention resides in both setting up means for printing prices per units of weight and setting up the price factors in the computer merely by inserting the plate into the recording and computing means.

Preferably the plate comprises two detachable sections which snap together. One of the sections functions to print the commodity name and the other one of the sections functions both to set up type for printing the selected commodity price and to set up the price factor in the computer. Many prices do not change for days and even weeks. In operation, the supervisor in a pre-packaging operation changes the price sections from day to day according to the current price list. From then, on, the commodity price is set up automatically by changing the commodity plate. For example, one plate might comprise a section which prints "Sirloin Steak" and a second section which prints or sets up type to print $1.20 per pound and also sets up $1.20 as a factor in the computer. The operator, by merely placing in the computing scale the "Sirloin Steak" commodity printing plate, automatically sets up the printer to print $1.20 per pound and sets up $1.20 as a factor in the computer. Hence, mistakes made by incorrect settings of the prior price setting knobs are eliminated, since the knobs are eliminated; much of the operator's time is saved, since he need not look up prices and change the price setting knobs every time a different commodity is to be pre-packaged; and costs are lowered by elimination of the interlock circuits which are necessary in the prior electrical and electronic scales to require the price setting knobs to be reset after every change-over of the printers for printing the names of different commodities.

The above and other objects and features of this invention will be appreciated more fully from the following detailed description when read with reference to the accompanying drawings wherein:

FIG. I is a schematic block diagram illustrating the general organization of a weighing scale and mechanism for reading the scale and indicating such reading in digital form and also multiplying such reading by an arbitrarily selected factor and indicating the product;

FIG. II is an exploded view in perspective of three printing plates one of which sets up the arbitrarily selected factor in the multiplying mechanism shown in FIG. I and which also prints such factor;

FIG. III is a front elevational view showing the three printing plates shown in FIG. II assembled in the computing weighing scale illustrated in FIG. I;

FIG. IV is a vertical sectional view taken along the line IV—IV of FIG. III;

FIG. V is a vertical sectional view taken along the line V—V of FIG. III;

FIG. VI is a fragmentary plan view of the apparatus shown in FIG. III;

FIG. VII is an enlarged plan view of the switch board which is shown incorporated in the computing weighing scale in FIG. III; and FIG. VIII is an exploded view in perspective showing a modification of the apparatus shown in FIG. II.

Referring to the drawings, a computing weighing scale 1a as contemplated in this invention is provided with a scanner or reading device 1 that is adapted to generate a series of pulses proportional in number to the numerical value of the reading. The computing weighing scale 1a (illustrated in simplified form in FIG. I) including weighing means, computing means and means for reading out the computer and the scanner 1 is shown in detail in U.S. application Serial No. 592,932 filed June 21, 1956 in the names of R. E. Bell et al., now Patent No. 3,055,585. These pulses are generated as independent, successive wave trains or trains of pulses and either may be generated continuously, i.e., one pulse train following the other after a short interval of time, or they may be generated in response to a starting or interrogating signal. An interrogating signal may be a demand made by a start button or other control for the reading device to execute a reading cycle.

The pulses generated in the reading device 1 are transmitted over a line 2 to a pulse shaper and wave train identifying mechanism 3 which in turn transmits pulses of sharp definite wave form over a line 4 to a multiplier pulse generator 5. The multiplier pulse generator 5 is used only in those installations or combinations where it is desired to indicate and/or record the product of the weight reading of the weighing scale times a selected price factor. The pulse generator 5 delivers to the counter lead 6 one pulse for each pulse received on the line 4. These pulses on the counter lead 6 are fed to a first decade 7 of a modified binary type counter which is composed of four decades including the decade 7 and other decades 8, 9, and 10 adapted to register the units, tens, hundreds, and thousands places of the indication read by the reading device 1. The maximum counting and indicating capacity of the counter composed of the decades 7, 8, 9, and 10 is 9,999 counts. It should be realized that the units, tens, hundreds and thousands may represent decimal fractions as well as whole numbers and that a small weighing scale, for example, could be read to a thousandth of a weight unit, either pound or kilogram, or if larger and read to a hundredth of a unit, could indicate up to 99 units. At the completion of a weight reading by the reading device 1, the count accumulated in the counter comprising decades 7 to 10, inclusive, is transmitted through an output cable 11 which includes a plurality of leads from each counter decade. The voltages transmitted through the cable 11 are transmitted to an indicating or recording device 12 which may provide on dials or number wheels a direct digital indication of the count and may also be arranged to position printing wheels so that printing impressions may be made directly from the indication. The indicating device 12 including gear means for setting up printing type wheels is shown and described in detail in U.S. Patent No. 2,759,672 issued August 21, 1956 to C. S. Simonds et al.

The pulse generator 5 generates a predetermined number of voltage pulses for each received pulse and is arranged to provide for each pulse on the line 4 an output of two pulses on an output line 13, four pulses on an output line 14, two pulses on an output line 15, and one pulse on an output line 16. These are transmitted through a cable 17 to a diode switching matrix or combining network 18 referred to as a diode matrix. The pulses transmitted through the cable 17 into the diode matrix 18 are combined therein to energize a set of nine leads appearing in a cable 19 in which the first lead carries a single pulse for each voltage pulse supplied to the pulse generator 5, a second carries two pulses, a third three, and so on up to nine. These leads are connected to three selector switches 19a included in a multiplier setting device 20 settable according to the price per unit of weight to condition the computer according to the selected price. The selector switches 19a, the stationary contacts of which are shown on a switch board in FIG. VII and hereinafter described in detail, correspond to the selector switches 234, 235 and 236 shown and described in detail in the foregoing noted U.S. application Serial No. 592,932. Selector switches 19a are straight line switches whereas selector switches 234, 235 and 236 disclosed in the copending application are rotary switches. However, the functions of switches 19a and switches 234–236 are identical, i.e., each of the switches functions as means to select one of the nine leads and connect it to an output lead. Switches 234–236 are set by hand whereas switches 19a are set by means of the removable plate technique of the invention.

As many selector switches are employed as there are digits or places in the multiplier to be used. Thus, to provide prices per pound in a three unit decimal money system, such as the dollar, dime, and cent coinage in use in the U.S.A., requires three selector switches 19a. The selector switches 19a are connected to output leads 21, 22, or 23 (FIGS. I and VII) which are carried through a cable 24 to combining amplifiers 25, 26, and 27 which transmit the pulses from the multiplier setting device 20 to corresponding decades of an electronic counting means 28 arranged to count the pulses representing the computed amount and comprising decades 29, 30, 31, 32, 33, and 34. In the example shown in FIG. I, the weighing scale has a capacity suitable for retail use in which the minimum graduation is one one-hundredth of a United States unit of weight. Likewise, the multiplier set into the multiplier setting device 20 may be a price represented by dollars, dimes and cents. Since the minimum monetary unit to be indicated is the cent, the first two decades of the amount-counting means or counter 28, i.e., the decades 29 and 30 which count the hundredths and tenths of cents, respectively, appearing in the product, are not connected into an indicating device but merely accumulate these fractional portions of a cent and transmit the accumulated portion into the next higher decade of the counting means 28.

The voltages in the decades 31 to 34, inclusive, representing the cents, dimes, dollars and tens of dollars of the computed amount or product are transmitted through a cable 35, containing eight leads for each decade, to an amount indicator 36, which like the indicating device 12 is shown and described in detail together with gearing for setting up printing type wheels in the foregoing noted U.S. Patent No. 2,759,672.

Since pulses are being transmitted from the pulse generator 5 through the diode matrix 18 and multiplier setting device 20 simultaneously to the leads 21, 22, or 23 and since these pulses are transmitted through the amplifiers 25, 26, and 27 into the counter decades 29, 30, and 31 simultaneously it is necessary, to prevent error, to delay any carry pulse from one decade to a following or higher place decade until after the transmission of pulses through the amplifiers 25, 26, and 27. Since the only place where such error could occur is in the decades that are fed from the amplifiers 26 and 27, arrangements are made so that the carry pulse from the decade 29 is transmitted through a lead 37 to a storage circuit 38 where it is held until the receipt by such storage circuit 38 of a clearing pulse from the pulse generator 5 by way of output terminal 39 and lead 40.

The clearing pulse from the output lead 39 transmitted through the lead 40 occurs once for each pulse transmitted by the lead 4 but occurs later in time than the pulses transmitted to the diode matrix 18 and factor setting device 20. If during the counting of a group of pulses from the diode matrix 18 the counter 29 exceeds its capacity and provides a carry pulse on lead 37, such pulse is stored and then transmitted upon receipt of the clearing pulse to the next amplifier 26 by way of lead 41 and then through such amplifier 26 into the next decade 30 of the amount counter 28. Likewise, carry pulses from the decade 30 are transmitted through a lead 42 to a second storage circuit 43. The carry circuit 43 thus is triggered or conditioned to transmit a pulse whenever it receives a carry pulse from the decade 30 and transmits such pulse upon the receipt of a clearing pulse received from output terminal 44 and transmitted through lead 45. Upon the receipt of the pulse from the output terminal 44 which occurs one unit of time, where a unit of time is the time spacing between pulses from the multiplier 5, after the pulse on the output terminal 39, the carry storage circuit 43, if conditioned by a carry pulse from the decade 30, transmits a pulse over a lead 46 to the combining amplifier 27 and thence to the counter decade 31.

The sequence or timing of the pulses from the pulse generator 5 is such that the output lead 13 transmits the first two pulses generated within the generator occurring during the first two units of time, the output lead 14 transmits the next four pulses occurring on the next four increments of time while the output lead 15 transmits the next two pulses occurring during the next two increments of time while the lead 16 transmits a single pulse occurring at the ninth unit of time. Next, the output terminal 39 transmits the tenth pulse and the output terminal 44 the eleventh pulse these occurring at generally equal intervals of time following the other pulses. The time spread between the pulse is sufficient so that, when a carry has occurred and such carry is stored in the carry storage circuit, for example, the circuit 38, the carry circuit may be tripped or energized by the pulse on the lead 39 and feed its pulse through the amplifier 26 into the decade 30 in time to clear that decade if it has counted to nine and is ready to transmit a carry pulse and have that carry pulse transmitted and stored in the carry circuit 43 in time to be transmitted, by triggering by a pulse from lead 44, so that the second circuit carry is accurately effected regardless of the particular condition in the electronic counting means.

In the operation, after a load is placed on the weighing scale a start signal is provided on a lead 47, which signal is transmitted to a sequence control 48 included in the reading station 49. The reading station 49 includes all of the structure enclosed in the dotted line including the indicators 12 and 36, the multiplier setting device 20, and the diode matrix 18. Upon receipt of the start signal on the line 47 the sequence control 48 transmits a pulse or signal over an output lead 50 leading to the reading device 1 causing it to start a scan. At the same time an unblocking signal is transmitted over a lead 51 to the amplifier and shaper stage so that this stage may transmit the pulses picked up from the reading device 1 and transmit them as properly shaped pulses over the lead 4 to the multiplier pulse generator 5.

Meanwhile, upon the receipt of the start signal on the lead 47 a reset signal is transmitted over lead 52 to each of the counter decades so as to set all of these decades to zero count in anticipation of the next reading. The one exception to the resetting to zero is the counter decade 30 of the amount counter which, in order to round off the nearest cent in value, is preset to a value of five representing a half cent. Therefore, as soon as a half cent or any number of cents plus a half cent has accumulated the cents counter decade 31 indicates the next cent in value thus rounding off the amount to the nearest cent.

Upon the receipt of an end of scan signal which may be transmitted over a lead 53 from the reading device 1 to the sequence control 48, the sequence control 48, through leads not shown in FIG. I energizes the visual indicating devices 12 and 36 so that they immediately scan the condition of the counter stages and position the indicating and printing wheels to positions corresponding to the counts then accumulated in the counter. Since this occurs after the end of the reading scan and since the electronic counters, both the weight indication counters 7 to 10 inclusive and the amount indication counters 31 to 34 inclusive, have reached their final indicating condition, the mechanical indicators 12 and 36 are ready to scan such counters and position themselves according to the indicated amounts.

Briefly, the reading device 1 generates a series of pulses one for each unit of weight. These pulses after proper shaping are transmitted through the pulse generator 5 which delivers a fixed number of pulses on each of several of a plurality of leads for each received pulse. That output lead of the pulse generator which transmits the last pulse generated therein is connected to the electronic counter comprising decades 7, 8, 9, and 10 adapted to count the actual number of pulses transmitted from the reading device 1. The pulse is taken from the last stage of the pulse generator rather than the input lead 4 as a safety feature because, when so connected, there can be no indication of either weight or amount unless the pulse generator 5 is functioning properly.

The pulses, i.e., the fixed number of pulses generated in the pulse generator 5 for each pulse in the series of pulses from the reading device 1, are transmitted through the combining matrix 18 to the selector switches 19a in the factor setting device 20 and the selected pulses constituting a predetermined number are transmitted through the amplifiers connected to the first few decades of the amount counter 28. These are totaled in the amount counter 28 which, with indicator 36, indicates the product of the reading of the condition responsive member as read by the reading device 1 and multiplied by the selected price factor set into the factor setting device 20.

The computing weighing scale is constructed as a unit with printing apparatus which is shown and described in copending U.S. application Serial No. 791,728 filed February 6, 1959 in the names of C. E. Adler and F. C. Carroll. The scale and the printing apparatus weighs commodities and issues a printed ticket, label or the like bearing thereon the net weight, price per pound, and computed value of a weighed commodity together with such variable data as the date, store code, commodity name, and commodity grade. Printing type wheels in the printing apparatus are set up by the above noted gearing connected to the indicating devices 12 and 36 for printing the weight reading shown as an example in FIG. I as 16.43 pounds on the indicating device 12 and for printing the value reading (weight times the price factor set into the factor setting device 20) shown as an example in FIG. I as $29.41. The commodity name and grade are printed from printing plates 54 and 55, respectively, as shown and described in detail in U.S. Patent No. 2,953,989 issued September 27, 1960 in the name of T. W. Gittus.

The price per pound is printed and also is set up into the factor setting device 20, i.e., is set up in the computer, according to the invention, by means of a detachably mounted plate 56 bearing first indicia 57 and second indicia or type 58 for printing the selected price.

The printing plates 55 and 54 are shown at a printing station in FIGS. III, IV and VI in operative positions in a frame 59 of a printer which for the purpose of illustration can be considered to be the printer for tickets, labels or the like which is shown and described in the foregoing application Serial No. 791,728. Tickets or labels (not shown) are pressed against the printing plates after they are inked as described in the application by a platten roller 60 as also described in the application.

Printing plate 55 functions both as a printing means and as a holder for the other printing plate 54; it includes a flat printing plate supporting portion 61 a part or edge 62 of which is bent or turned up out of the plane of the supporting portion 61. The bent part 62 of the printing plate 55, which is the front portion of the plate, functions as a place to put indentification indicia 63 which correspond to the printing type 64 carried by the supporting portion 61 of the printing plate. These type 64 can be made, for example, of rubber, metal, or plastic and can be formed integrally with the plate or made separately and attached by means of an adhesive and are used to print the grade of beef being prepackaged, such grades being U.S. Prime, Choice, Good, Utility and Commercial. For commodities, such as cheese or luncheon meat, which are not graded the area on the plate occupied by the type 64 is left blank. Hence, six of the printing plates 55 are needed for a complete set, five for the five grades of beef and one for the blank, and are termed "commodity grade printing plates." The commodity grade printing plate 55 also carries type 65 for printing a store code.

The bent part or front portion 62 of the printing plate 55 also functions as a support for a pair of locating and latch pins 66 each of which includes a pair of spaced shoulders 67 and a portion which extends through the front portion 62 of the printing plate 55 to receive a knob handle 68. The pins 66 are received in horizontal openings 69 in the frame 59 with the shoulders 67 that are remote from the handles 68 against abutment surfaces 70 of the frame to accurately locate the type 64 and 65 in the printer and with the upper surface of the type bearing portion 61 of the printing plate 55 against an abutment surface 71 of the frame 59 to impart stability to the printing plate 55. It is vital that the printing type 64 and 65 be accurately located in the printer so that no overlapping of the various printed matter occurs, the printer printing and issuing a ticket or label bearing thereon the net weight, price per pound, and computer value of a weighed commodity together with such variable data as the date, store code, commodity name, and commodity grade.

A slide keeper 72 supported on the shoulders of shoulder screws 73 carried by the frame 59 above the abutment surfaces 70 of the frame is selectively slidable between a locked and an unlocked position as determined by the length of slots 74 in the keeper that cooperate with the shoulder screws 73. In the locked position which is shown in FIGS. III, IV and VI, tongues 75 on the slide keeper 72 are received in a tight fit between the spaced shoulders 67 on the pins 66 to hold the commodity grade printing plate 55 in place, the printing plate 55 being readily removable from the frame 59 of the printer by sliding the keeper 72 to its unlocked position and withdrawing the pins 66 from the openings 69 in the frame.

The commodity grade printing plate 55 which functions additionally as a holder for the commodity name printing plate 54 is provided with a slot 76 which extends from the front portion 62 of the plate 55 toward the printing type 64 on the plate, the slot 76 being transverse to such type 64 and having an enlarged open end 77 at the front portion 62 and a closed end 78 remote from the front portion 62. A spring clip or keeper 79 is secured to the type bearing portion 61 of the plate 55 at the closed end of the slot with its open mouth facing the slot, the spring clip 79 being on the upper surface of the type bearing portion 61 and the type 64 being on the lower surface of the type bearing portion 61.

The printing plate 54 includes a flat portion 80 bearing type 81 for printing the commodity name a minor part or front portion 82 of which type bearing portion is bent out of the plane of the type bearing portion and which is suitable for use as a handle and as a place to put identification indicia 83 corresponding to the type 81. Three shouldered guide and lock pins 84 are carried by the upper surface of the type bearing portion 80 of the printing plate, the lower surface of the type bearing portion 80 being the surface on which the type 81 are located, in a straight row which extends transverse to the front portion 82 of the plate and to the type 81 on the plate.

The printing plate 54 is inserted in the holder 55 by inserting the first one of the pins 84 is the enlarged open end 77 of the slot 76 and then the other two of the pins until such first pin contacts the closed end 78 of the slot. The edges of the printing plate 55 along the slot 76 fit snugly between the shoulders on the pins 84 and the upper surface of the type bearing portion 80 of the printing plate 54. A head 85 on such first one of the pins 84 expands the spring clip 79 as it approaches the closed end 78 of the slot 76, the clip resiliently returning to its original position to embrace the head 85 when the printing plate 54 is inserted fully in its holder 55 to retain the plate 54 in the holder is a readily removable condition.

In the inserted position, the type 81 on the printing plate 54 are juxtaposed to the type 64 on the holder or commodity grade printing plate 55 in an accurately located position, the type 64 printing the grade of the beef being prepackaged and the type 81 printing the name of the cut of the beef being prepackaged. Hence, the printing plate 54 is termed "commodity name printing plate." The commodity name printing plate 54 can be readily removed from the printer either by sliding it out of the slot 76 in the commodity grade printing plate or holder 55 or by removing the holder 55 from the frame 59 of the printer as hereinbefore described.

In operation, in processing a side of beef, a commodity grade printing plate or holder 55 is chosen which corresponds to the grade of the beef being processed. The identification indicia 63 aid in the selection. The printing plate or holder 55 is locked in the printer by means of the slide keeper 72, the shoulders 67 remote from the handles 68 on the pins 66 locating the holder accurately relative to the printing station in operative position and the slide keeper locking the holder in such position. The type 64 carried by the holder print the grade of the beef, the holder being left in the printer as long as the grade of the beef being prepackaged remains unchanged.

Commodity name printing plates 54 are substituted one for the other in the holder 55 in operative positions accurately located, by means including the closed end 78 of the slot 76 in the holder, relative to the printing station as the various cuts of beef are prepackaged. Type 81 carried by the printing plates 54 print information of a second kind, i.e., the names of the cuts of beef. Since the commodity name plates 54 are readily detachable from the holder 55, a relatively large number of combinations of the two kinds of information can be printed from a relatively small number of printing plates.

In processing commodities which do not have grades, such as cheese and luncheon meat, a holder 55 is chosen which does not carry printing type, i.e., it is a blank. Commodity name printing plates 54 are substituted one for the other in the holder 55 as the various commodities are prepackaged.

Usually, every time that a commodity name printing plate 54 is changed in the printer, a new price must be set up. This is accomplished by changing the price clip or plate 56 which is detachably mounted on the printing plate 54. The plate 56 is provided with a slot 86 which extends from a bent-up front portion 87 of the plate 56 toward the printing type 58 on the plate, the slot 86 being transverse to such type 58 and having an enlarged open end 88 at the front portion 87 and a closed end 89 remote from the front portion 87. A spring clip or keeper 90 is secured to the plate 56 at the closed end of the slot 86 with its open mouth facing the slot, the spring clip 90 being on the upper surface of the plate 56 and the type 58 being on the lower surface of the plate.

The printing plate 54 includes a flat extension 91 carrying three shouldered guide and lock pins 92 on its upper surface in a straight row extending transverse to the front portion 82 of the plate. The plate 56 is inserted or clipped in the commodity name printing plate 54 by inserting the first one of the pins 92 in the enlarged open end 88 of the slot 86 and then the other two of the pins until such first pin contacts the closed end 89 of the slot. The edges of the plate 56 along the slot 86 fit snugly between the shoulders on the pins 92 and the upper surface of the plate extension 91. A head 93 on such first one of the pins 92 expands the spring clip 90 as it approaches the closed end 89 of the slot 86, the clip resiliently returning to its original position to embrace the head 93 when the plate 56 is inserted fully to retain the plate 56 in a readily removable condition. Identification indicia 94 on the front portion 87 of the plate 56 correspond to the type 58. The type 58 hereinbefore defined as "second indicia" on the plate 56 print the selected price of the commodity name which is printed by the printing plate 54.

The first indicia 57 on the plate 56 include three pins 95, one for each of the selector switches 19a. The pins 95 are switch operators and are arranged in holes 96 in the plate 56 in a pattern in accordance with the particular price printed by the type 58 on the plate 56. There are three straight, parallel rows of the holes 96. Each row has ten holes and extends transverse to the front plate portion 87. The hole 96 in each of the rows most remote from the front plate portion 87 is the number one hole, the hole next adjacent the number one hole in each of the rows is the number two hole, etc. The last hole in each of the rows is used for zero. As shown in FIG. II, the pins 95 are arranged for a price of three dollars and fifty-three cents. Conceivably, the switch operators could be constructed in other ways; for example, instead of pins set in holes, tabs could be bent up out of the material of the plate 56 itself in a pattern in accordance with the particular price printed by the type 58.

Each of the three selector switches 19a includes a pair of movable brushes 97 carried by a slider 98 slidably mounted in slot 99 in a bracket 100 carried by the frame 59. The three slots 99 are parallel to each other and parallel to the rows of holes 96 in the plate 56 when the plate 56 is in operative position as shown in FIGS. III and VI. In such operative position, the type 58 on the plate 56 are adjacent to and in the same plane as the type 64 and 81 for cooperation with the platten roller 60. As shown in FIG. III, the sliders 98 are grooved to provide horizontal surfaces which are slidable on the bracket 100 and each is movable in a path which is slightly above and in registry with a corresponding one of a row of plate holes 96 when the plate 56 is in printing position. Each of the sliders 98 is provided with a horizontal hole 101 (FIG. V) which receives a stationary pin 102 carried by a turned-up end 103 of the bracket 100. A return coil spring 104 surrounds the pin 102 and is compressed between the slider 98 and the bracket end 103. The sliders 98 are slidable on the pins 102.

Each of the three selector switches 19a also includes a straight row of ten contacts 105 (FIG. VII) and a common strip contact 106 mounted on a switch board 107. Nine of the contacts in each of the three sets of contacts 105 are connected to the set of nine leads in the cable 19 (FIG. I) as hereinbefore described and the common contacts 106 are connected to output leads 21, 22 or 23 (FIGS. I and VII). The three remaining contacts 105 are used for zero. The switch board 107 is supported in a horizontal position on the bracket 100 as shown in FIG. III. There is a contact 105 for each of the holes 96 in the plate 56.

The selector switches 19a are operated by the switch-operating pins 95. Insertion of the commodity name plate 54 into the printer carries the plate 56 into printing position. In moving to such position, the pins 95 on the plate 56 engage the sliders 98 and slide them in opposition to the return springs 104 a distance depending on the locations of the pins 95 in the holes 96. The contacts 105 and the plate holes 96 are so arranged that, when the pins 95 are in the number one holes 96, the selector switches 19a set up ones in the multiplier to be used, when the pins 95 are in the number two holes 96, the selector switches 19a set up twos in the multiplier to be used, etc. Removal of the plates 54 and 56 from the printer permits the return springs 104 to move the selector switches 19a to blank position, i.e., off of the contacts 105.

One of the two brushes 97 in each of the pair of brushes engages its common contact 106 and the other one of such pair of brushes engages one of its ten contacts 105 when the plates 54 and 56 are in printing position. This completes a circuit from such engaged one of the ten contacts 105 through a brush-connecting plate 108 atop the slider 98 to the common contact 106 to set up the price per pound in the factor setting device 20, i.e., set up in the computer.

In operation, the supervisor in a pre-packaging operation changes the price clips or plates 56 from day to day according to the current price list. From then on, the commodity prices are set up automatically by changing the commodity plates 54. For example, the commodity plate 54 might have type 81 which print "Sirloin Steak" and the current price list might list such streak as $1.20 per pound. The supervisor snaps a $1.20 price clip or plate 56 on the commodity plate. The identification indicia 87 on the price plate 56 indicate $1.20, the type 58 print $1.20, and the pins 95 are in the "one," "two" and "zero" holes 96, respectively. The operator, by merely placing in the computing scale the "Sirloin Steak" commodity printing plate, automatically positions the price type 58 in the printer to print $1.20 per pound and sets up $1.20 as a factor in the computer.

Accordingly, a feature of the computing weight scale resides in the technique of setting up means for printing the prices per units of weight and setting up the price factors in the computer of such weighing scale by merely inserting a coded plate or clip into the scale.

Another feature resides in the technique of setting up means for printing the commodity names along with the commodity prices and setting up the price factors in the computer by merely inserting commodity name plates into the scale. This eliminates mistakes made by incorrect settings of the prior price setting knobs, since the knobs are eliminated; much of the operator's time is saved, since he need not look up prices and change the price setting knobs every time a different commodity is to be pre-packaged; and costs are lowered by elimination of the interlock circuits which are necessary in the prior electrical and electronic computing scales to require the price setting knobs to be reset after every change-over of the printers for printing the names of different commodities.

A modification of the technique in setting up means for printing the prices per units of weight and setting up the price factors in the computer is illustrated in FIG. VIII. Reference numerals in FIG. VIII which are similar to those in FIGS. I–VII refer to parts which are alike in structure and in function. The plates 54b and 56b (FIG. VIII) are like the plates 54 and 56 (FIG. II) except that the plate 56b does not bear printing type. The plate 56b, however, sets up print wheels 109 which print prices per units of weight.

The print wheels 109 are rotatably mounted on a stationary shaft 110 and each bears peripheral printing type 111 which print one through nine and zero and each is provided with a pinion 112 which rotates about the axis of the shaft as one with its print wheel. Three racks 113 are provided one for each of the pinions 112. The racks 113 and the pinions 112 always are engaged, the racks being slidable in a stationary rack guide 114. The rack guide includes a first pin 115 received in slots 116 in the racks, a second pin 117 upon which surfaces 118 of the racks slide, and a third pin 119 serving as an anchor for return springs 120 attached to the racks. Spacers 121 on the pins separate the racks and heads 122 on the pins 115 and 117 keep the racks in place on the pins. Pin 115 is so positioned that suitable meshing pressure between the racks and the pinions is maintained. Each of the racks 113 carries a pair of selector switch brushes 97b. Alternatively, the racks 113 could be carried by the plate 56b.

In operation, removal of the plates 54b and 56b from the computing weighing scale permits the return springs 120 to move the racks 113 to the left as viewed in FIG. VIII until the racks engage the stationary pins 115 and 117. This rotates the print wheels 109 to positions wherein each prints zero and slides the brushes 97b to zero contacts 105b setting a price factor of zero in the computer.

The hole 96b in each of the rows of holes in the plate 56b closest to the front plate portion 87b is the number one hole, the hole next adjacent the number one hole in each of the rows is the number two hole, etc. The last hole in each of the rows is not used in this modification. As shown in FIG. VIII, the pins 95b are arranged for a price of three dollars and fifty-three cents.

The racks 113 are driven by the pins 95b. Insertion of the commodity name plate 54b into the printer carries the plate 56b into operative position. In moving to such position, the pins 95b on the plate 56b engage back surfaces 123 on the racks 113 and slide them in opposition to the return springs 120 a distance depending on the locations of the pins 95b in the holes 96b. The contacts 105b and the plate holes 96b are so arranged that, when the pins 95b are in the number one holes 96b, the selector switches 19b set up ones in the multiplier to be used, when the pins 95b are in the number two holes 96b, the selector switches 19b set up twos in the multiplier to be used, etc. The print wheels 109, pinions 112 and racks 113 are so arranged that, when the pins 95b are in the number one holes 96b, the print wheels 109 are set up to print ones, when the pins 95b are in the number two holes 96b, the print wheels 109 are set up to print twos, etc. The type 111 on the print wheels 109 when rotated into printing position are adjacent to and in the same as the type 81b on the commodity name printing plate 54b for cooperation with the platten roller 60 (FIG. III). Hence, the insertion of the plate 56b into the printer both sets up means for printing the prices per units of weight, i.e., the print wheels 109, and sets up the price factors in the computer by operating the selector switches 19b.

It is to be understood that the above description is illustrative of this invention and that various modifications thereof can be utilized without departing from its spirit and scope.

Having described the invention, I claim:

1. A computing weighing scale comprising, in combination, means for weighing a commodity, computing the value of the commodity according to its weight and a selected price and recording the value, mechanism operatively connected to said means for conditioning said means according to the selected price, printing type for printing the selected price, and a detachably mounted plate cooperatable with the mechanism and with the printing type for operating the mechanism according to the selected price and for moving the printing type into printing position.

2. A computing weighing scale according to claim 1 wherein the mechanism includes a selector switch in electrical circuit with said means.

3. A computing weighing scale according to claim 1 wherein the printing type are borne by the plate and the plate operates the mechanism and moves the printing type into printing position simultaneously.

4. A computing weighing scale according to claim 1 wherein the printing type are rotatably mounted.

5. A computing weighing scale comprising, in combination, means for weighing a commodity, computing the value of the commodity according to its weight and a selected price and recording the value, a detachably mounted first plate bearing indicia for printing the name of the commodity, mechanism operatively connected to said means for conditioning said means according to the selected price, printing type for printing the selected price, and a second plate removably attached to the first plate cooperatable with the mechanism and with the printing type for operating the mechanism according to the selected price and for moving the printing type into printing position.

6. A computing weighing scale according to claim 5 wherein the mechanism includes a selector switch in electrical circuit with said means.

7. A computing weighing scale according to claim 5 wherein the printing type are borne by the second plate.

8. A computing weighing scale according to claim 5 wherein the printing type are rotatably mounted.

9. A computing weighing scale comprising, in combination, means for weighing a commodity, computing the value of the commodity according to its weight and a selected price and recording the value, a detachably mounted printing plate bearing coded elements corresponding to the selected price and indicia for printing the selected price, and mechanism operatively connected to said means and cooperating with said coded elements for conditioning said means according to the selected price, the printing plate cooperating with said mechanism and moving the indicia into printing position simultaneously.

10. A computing weighing scale comprising, in combination, means for weighing a commodity, computing the value of the commodity according to its weight and a selected price and recording the value, a detachably mounted first printing plate bearing indicia for printing the name of the commodity, a second printing plate removably attached to the first plate and bearing coded elements corresponding to the selected price and indicia for printing the selected price, and mechanism operatively connected to said means and cooperating with said coded elements for conditioning said means according to the selected price.

11. A computing weighing scale comprising in combination, scale means for weighing a commodity, computing means responsive to the scale means for computing the value of the commodity according to its weight and a selected price, means operatively connected to the computing means for recording the value, a computer setting device in circuit with the computing means and settable according to the selected price, the setting device including a selector switch for each digit in the selected price, a detachably mounted first printing plate bearing indicia for printing the name of the commodity, and a second printing plate removably attached to the first plate and bearing indicia for printing the selected price and coded elements for operating the switches to set up the selected price in the computing means.

12. A computing weighing scale comprising, in combination, a printing plate for printing a selected price of a commodity, scale means for weighing the commodity, computing means of which the printing plate is a part responsive to the scale means and to the printing plate for computing the value of the commodity according to its weight and the selected price, and means operatively connected to the computing means for recording the value.

13. A computing weighing scale comprising, in combination, a detachably mounted first printing plate bearing indicia for printing the name of a commodity, a second plate removably clipped to the first plate and bearing switch operators arranged in accordance with the selected price, scale means for weighing the commodity, computing means responsive to the scale means and having switches settable by the switch operators for computing the value of the commodity according to its weight and the selected price, and means for reading out the computer, the first printing plate moving its indicia into printing position and the second plate setting the switches simultaneously.

14. A computing weighing scale comprising, in combination, a computer for computing the value of a commodity according to its weight factor and a selected price factor, means for setting up the weight factor in the computer, and printing plate means for both setting up the price factor in the computer and printing the price factor.

15. A computing weighing scale according to claim 14 wherein the printing plate means includes a detachably mounted first plate bearing indicia for printing the name of the commodity and a second plate removably attached to the first plate for both setting up the price factor in the computer and printing the price factor.

16. A computing weighing scale comprising, in combination, a computer for computing the values of commodities according to the weight factors and selected price factors, means for setting up the weight factors in the computer, printing means for printing the price factors, and detachably mounted means bearing coded elements corresponding to a selected price for both setting up the price factor in the computer and setting up the printing means simultaneously.

17. A computing weighing scale comprising, in combination, a computer for computing the values of commodities according to their weight factors and selected price factors, means for setting up the weight factors in the computer, printing means for printing the price factors, switch means connected to the computer, gear means carrying a movable portion of the switch means and operatively connected to the printing means, and detachably mounted means bearing coded elements corresponding to a selected price engageable with the gear means for driving the gear means to both set up the price factor in the computer and set up the printing means.

18. A computing weighing scale comprising, in combination, scale means for weighing commodities, computing means responsive to the scale means for computing the values of the commodities according to their weights and selected prices, a computer setting device in circuit with the computing means and settable according to the selected price, printing means for printing the price factors, gear means operatively connected both to the computer setting device and the printing means, and plate means bearing coded elements corresponding to a selected price engageable with the gear means for driving the gear means a distance predetermined by the arrangement of the coded elements to both set up the selected price factor in the computing means and set up the printing means to print the selected price factor.

19. A computing weighing scale comprising, in combination, a computer for computing the value of a commodity according to its weight factor and a selected price factor, means for setting up the weight factor in the computer, printing means for printing the name and the price of the commodity, and a commodity name plate for both setting up the printing means and the price factor in the computer.

20. A computing weighing scale according to claim 19 wherein the means for printing the name of the commodity includes type carried by the plate.

References Cited in the file of this patent

UNITED STATES PATENTS

| | | |
|---|---|---|
| 2,132,412 | Gollwitzer | Oct. 11, 1938 |
| 2,363,096 | Sullivan | Nov. 21, 1944 |
| 2,673,033 | Gruver | Mar. 23, 1954 |
| 2,759,670 | Beach | Aug. 21, 1956 |
| 2,948,465 | Allen | Aug. 9, 1960 |
| 2,948,466 | Allen | Aug. 9, 1960 |